(12) United States Patent
Glasgo

(10) Patent No.: US 6,318,393 B1
(45) Date of Patent: Nov. 20, 2001

(54) PORTABLE VEHICLE COVERING DEVICE

(76) Inventor: Winstun Glasgo, 5 Ward Lane Juan, Trinidad (TT)

(*) Notice: Subject to any disclaimer, the term of this patent is extended or adjusted under 35 U.S.C. 154(b) by 0 days.

(21) Appl. No.: 09/525,603

(22) Filed: Mar. 14, 2000

(51) Int. Cl.⁷ ....................................................... B60J 11/00
(52) U.S. Cl. ....................................... 135/88.07; 135/88.05; 52/3; 52/DIG. 12; 52/DIG. 14; 150/166; 196/136
(58) Field of Search ......................... 135/88.05, 88.07, 135/88.14, 88.15, 88.16; 52/DIG. 12, DIG. 14, 3; 296/136, 163, 95.1, 99.1; 150/166; 160/222, 370.2

(56) References Cited

U.S. PATENT DOCUMENTS

| | | | |
|---|---|---|---|
| 4,848,827 * | 7/1989 | Ou | 296/99.1 |
| 5,230,545 * | 7/1993 | Huang et al. | 296/95.1 |
| 5,690,376 * | 11/1997 | Leidal | 296/99.1 |
| 5,762,393 * | 6/1998 | Darmas | 296/98 |

FOREIGN PATENT DOCUMENTS

| | | | |
|---|---|---|---|
| 31682 * | 5/1936 | (JP) | 296/99.1 |
| 798110 A * | 5/1936 | (FR) | 135/88.07 |

* cited by examiner

Primary Examiner—Robert Canfield
(74) Attorney, Agent, or Firm—Goldstein Law Offices, P.C.

(57) ABSTRACT

A portable vehicle covering device including a roof portion coupled with respect to the roof of the vehicle. A hood portion is slidably received within the roof portion in a retracted orientation. The hood portion slides outwardly of the roof portion in an extended orientation for covering the hood of the vehicle. A trunk portion is slidably received within the roof portion in a retracted orientation. The trunk portion slides outwardly of the hood portion in an extended orientation for covering the trunk of the vehicle. A first side door portion is slidably received within the roof portion in a retracted orientation. The first side door portion extends outwardly of the roof portion in an extended orientation for covering the door of the first side of the vehicle. The first side door portion includes front and rear portions for selectively covering the forward and rearward portions of the first side of the vehicle. A second side door portion is slidably received within the roof portion in a retracted orientation. The second side door portion extends outwardly of the roof portion in an extended orientation for covering the door of the second side of the vehicle. The second side door portion includes front and rear portions for selectively covering the forward and rearward portions of the second side of the vehicle.

1 Claim, 2 Drawing Sheets

PORTABLE VEHICLE COVERING DEVICE

BACKGROUND OF THE INVENTION

The present invention relates to a portable vehicle covering device and more particularly pertains to protecting a vehicle from sun damage and other elements.

The use of vehicle covering devices is known in the prior art. More specifically, vehicle covering devices heretofore devised and utilized for the purpose of covering vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,944,321 to Moyet-Ortiz discloses a portable vehicle garage structure constructed of a fabric with a frame constructed of lightweight material, such as aluminum or steel. U.S. Pat. No. 4,856,842 to Ross discloses a retractable automobile cover. U.S. Pat. No. 5,029,033 to Gillem discloses a fabric car cover.

While these devices fulfill their respective, particular objective and requirements, the aforementioned patents do not describe a portable vehicle covering device for protecting a vehicle from sun damage and other elements.

In this respect, the portable vehicle covering device according to the present invention substantially departs from the conventional concepts and designs of the prior art, and in doing so provides an apparatus primarily developed for the purpose of protecting a vehicle from sun damage and other elements.

Therefore, it can be appreciated that there exists a continuing need for a new and improved portable vehicle covering device which can be used for protecting a vehicle from sun damage and other elements. In this regard, the present invention substantially fulfills this need.

SUMMARY OF THE INVENTION

In the view of the foregoing disadvantages inherent in the known types of vehicle covering devices now present in the prior art, the present invention provides an improved portable vehicle covering device. As such, the general purpose of the present invention, which will be described subsequently in greater detail, is to provide a new and improved portable vehicle covering device which has all the advantages of the prior art and none of the disadvantages.

To attain this, the present invention essentially comprises a roof portion coupled with respect to the roof of the vehicle. The roof portion has a generally rectangular configuration. The roof portion has a hollow interior with an open forward end, an open rearward end, an open first side, and an open second side. A hood portion is slidably received within the open forward end of the roof portion in a retracted orientation. The hood portion slides outwardly of the roof portion in an extended orientation for covering the hood of the vehicle. A trunk portion is slidably received within the open rearward end of the roof portion in a retracted orientation. The trunk portion slides outwardly of the roof portion in an extended orientation for covering the trunk of the vehicle. A first side door portion is slidably received within the open first side of the roof portion. The first side door portion extends outwardly of the roof portion in an extended orientation for covering the door of the first side of the vehicle. The first side door portion has a generally rectangular configuration and a hollow interior. The first side door portion has an open forward end and an open rearward end. A first front portion is slidably received within the open forward end of the first side portion in a retracted orientation. The first front portion extends outwardly of the first side portion in an extended orientation for covering the forward portion of the first side of the vehicle. A first back portion is slidably received within the open rearward end of the first side portion in a retracted orientation. The first back portion extends outwardly of the first side portion in an extended orientation for covering the rearward portion of the first side of the vehicle. A second side door portion is slidably received within the open second side of the roof portion. The second side door portion extends outwardly of the roof portion in an extended orientation for covering the door of the second side of the vehicle. The second side door portion has a generally rectangular configuration and a hollow interior. The second side door portion has an open forward end and an open rearward end. A second front portion is slidably received within the open forward end of the second side portion in a retracted orientation. The second front portion extends outwardly of the second side portion in an extended orientation for covering the forward portion of the second side of the vehicle. A second back portion is slidably received within the open rearward end of the second side portion in a retracted orientation. The second back portion extends outwardly of the second side portion in an extended orientation for covering the rearward portion of the second side of the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable vehicle covering device which has all the advantages of the prior art vehicle covering devices and none of the disadvantages.

It is another object of the present invention to provide a new and improved portable vehicle covering device which may be easily and efficiently manufactured and marketed.

It is a further object of the present invention to provide a new and improved portable vehicle covering device which is of durable and reliable construction.

An even further object of the present invention is to provide a new and improved portable vehicle covering device which is susceptible of a low cost of manufacture with regard to both materials and labor, and which accordingly is then susceptible of low prices of sale to the consuming public, thereby making such a portable vehicle covering device economically available to the buying public.

Even still another object of the present invention is to provide a new and improved portable vehicle covering device for protecting a vehicle from sun damage and other elements.

Lastly, it is an object of the present invention to provide a new and improved portable vehicle covering device including a roof portion coupled with respect to the roof of the vehicle. A hood portion is slidably received within the roof portion in a retracted orientation. The hood portion slides outwardly of the roof portion in an extended orientation for covering the hood of the vehicle. A trunk portion is slidably received within the roof portion in a retracted orientation. The trunk portion slides outwardly of the roof portion in an extended orientation for covering the trunk of the vehicle. A first side door portion is slidably received within the roof portion in a retracted orientation. The first side door portion extends outwardly of the roof portion in an extended orientation for covering the door of the first side of the vehicle. The first side door portion includes front and rear portions for selectively covering the forward and rearward portions of the first side of the vehicle. A second side door portion is slidably received within the roof portion in a retracted orientation. The second side door portion extends outwardly of the roof portion in an extended orientation for covering the door of the second side of the vehicle. The second side door portion includes front and rear portions for selectively covering the forward and rearward portions of the second side of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
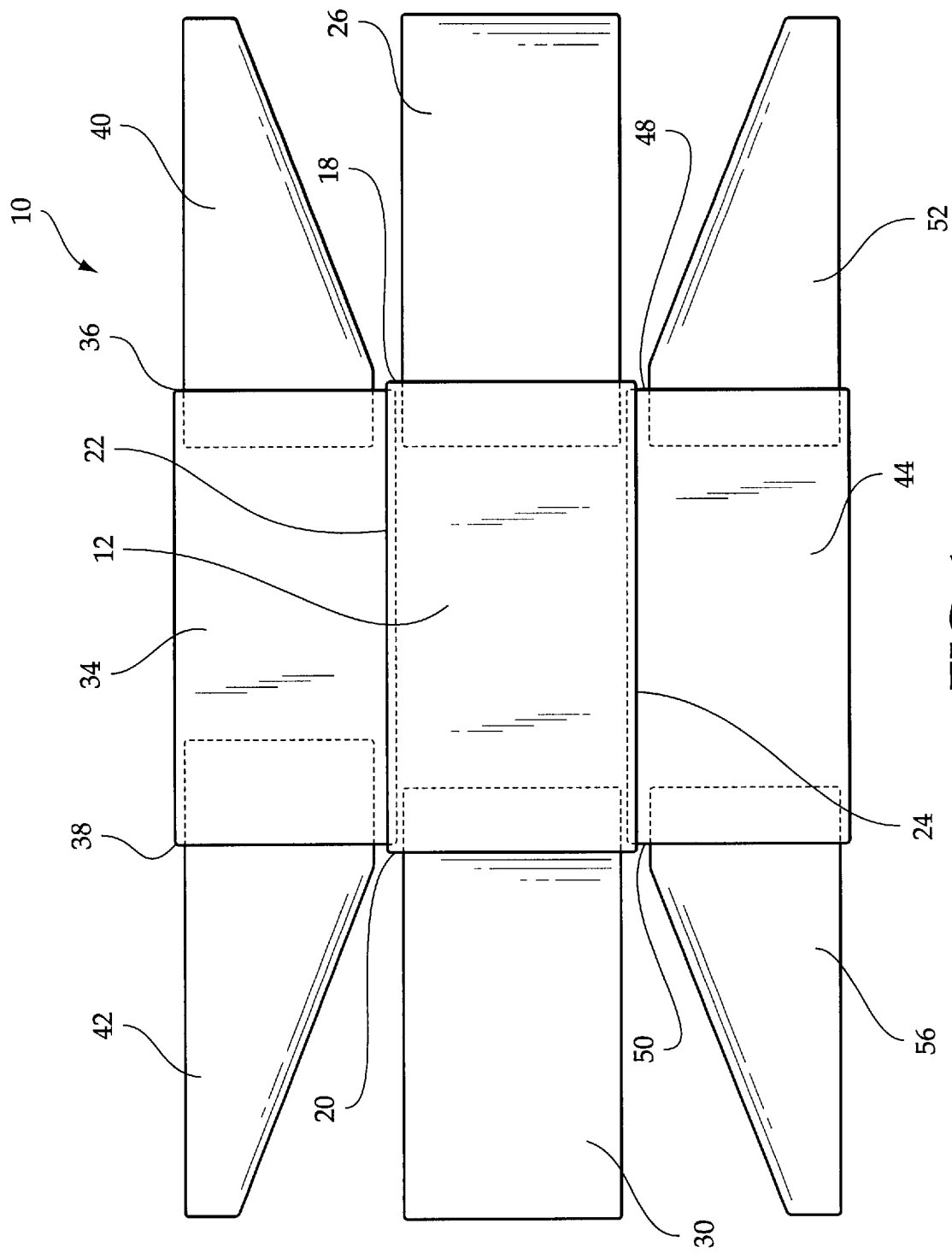
FIG. 1 is a plan view of the preferred embodiment of the portable vehicle covering device constructed in accordance with the principles of the present invention.
Figure 2:
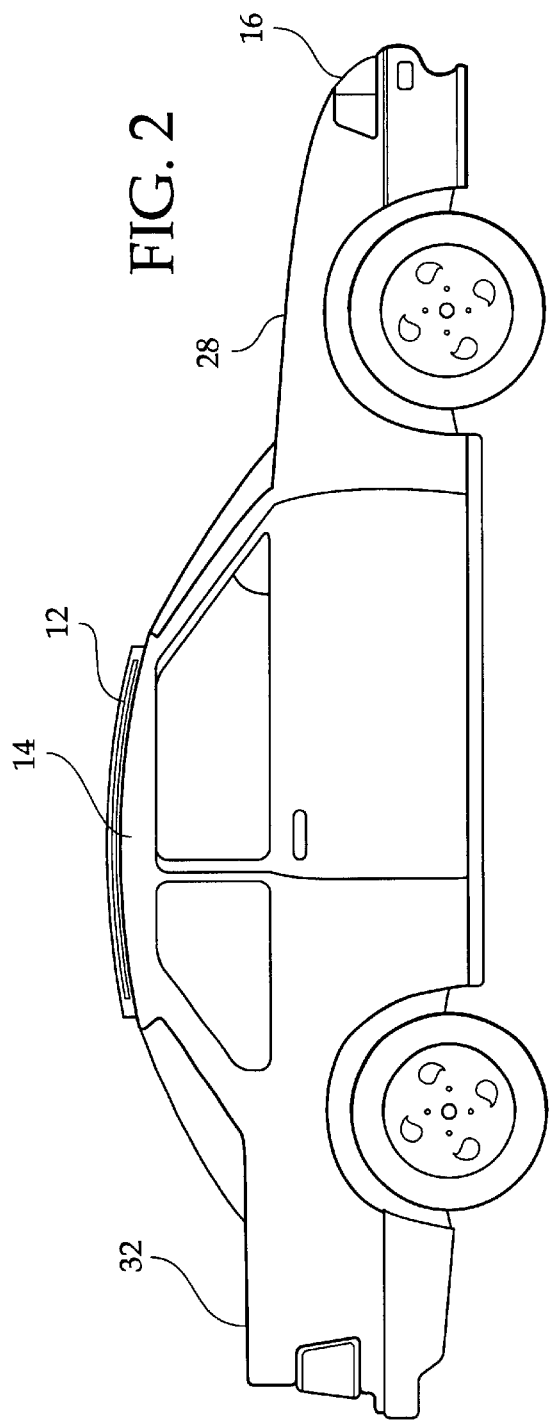
FIG. 2 is a side view of the present invention illustrated in a retracted orientation.
Figure 3:
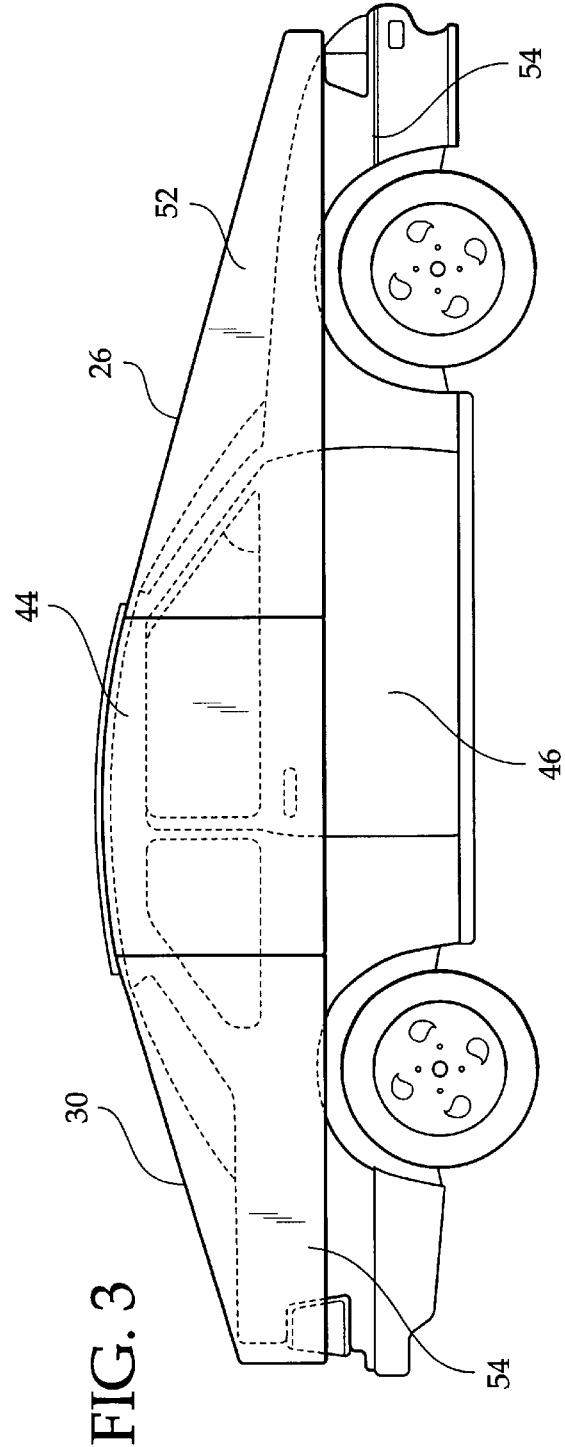
FIG. 3 is a side view of the present invention illustrated in an extended orientation.

With reference now to the drawings, and in particular, to FIGS. 1 through 3 thereof, the preferred embodiment of the new and improved portable vehicle covering device embodying the principles and concepts of the present invention and generally designated by the reference number 10 will be described.

Specifically, it will be noted in the various Figures that the device relates to a portable vehicle covering device for protecting a vehicle from sun damage and other elements. In its broadest context, the device consists of a roof portion, a hood portion, a trunk portion, a first side door portion, and a second side door portion. Such components are individually configured and correlated with respect to each other so as to attain the desired objective.

The roof portion 12 is coupled with respect to the roof 14 of the vehicle 16. The roof portion 12 can be permanently secured to the roof 14 via normal securement means. Alternately, the roof portion 12 can be temporarily secured to the roof 14. The roof portion 12 has a generally rectangular configuration. The shape of the roof portion 12 will conform to the shape of the roof 14 of the vehicle 16. The roof portion 12 has a hollow interior with an open forward end 18, an open rearward end 20, an open first side 22, and an open second side 24.

The hood portion 26 is slidably received within the open forward end 18 of the roof portion 12 in a retracted orientation. Note FIG. 2. The hood portion 26 slides outwardly of the roof portion 12 in an extended orientation for covering the hood 28 of the vehicle 16.

The trunk portion 30 is slidably received within the open rearward end 20 of the roof portion 12 in a retracted orientation. Note FIG. 2. The trunk portion 30 slides outwardly of the roof portion 12 in an extended orientation for covering the trunk 32 of the vehicle 16.

The first side door portion 34 is slidably received within the open first side 22 of the roof portion 12. The first side door portion 34 extends outwardly of the roof portion 12 in an extended orientation for covering the door of the first side of the vehicle 16. The first side door portion 34 has a generally rectangular configuration and a hollow interior. The first side door portion 34 has an open forward end 36 and an open rearward end 38. A first front portion 40 is slidably received within the open forward end 36 of the first side portion 34 in a retracted orientation. The first front portion 40 extends outwardly of the first side door portion 34 in an extended orientation for covering the forward portion of the first side of the vehicle 16. A first back portion 42 is slidably received within the open rearward end 38 of the first side door portion 34 in a retracted orientation. The first back portion 42 extends outwardly of the first side door portion 34 in an extended orientation for covering the rearward portion of the first side of the vehicle 16.

The second side door portion 44 is slidably received within the open second side 24 of the roof portion 12. The second side door portion 44 extends outwardly of the roof portion 12 in an extended orientation for covering the door 46 of the second side of the vehicle 16. The second side door portion 44 has a generally rectangular configuration and a hollow interior. The second side door portion 44 has an open forward end 48 and an open rearward end 50. A second front portion 52 is slidably received within the open forward end 48 of the second side door portion 44 in a retracted orientation. The second front portion 52 extends outwardly of the second side door portion 44 in an extended orientation for covering the forward portion 54 of the second side of the vehicle 16. A second back portion 56 is slidably received within the open rearward end 50 of the second side door portion 44 in a retracted orientation. The second back portion 56 extends outwardly of the second side door portion 44 in an extended orientation for covering the rearward portion 58 of the second side of the vehicle 16. Note FIG. 3.

In use, the roof portion 12 is secured to the vehicle 16. When not in use, the hood portion 26, the trunk portion 30, and the first and second side door portions 34,44 are disposed within the hollow interior of the roof portion 12. Note FIG. 2. When covering the vehicle 16 is desired, the hood portion 26, the trunk portion 30, and the first and second side door portions 34 slide outwardly of the roof portion 12 to cover the respective portions of the vehicle 16 that they are designed to protect. The front and back portions of the side door portions are then extended outwardly to cover the parts of the vehicle 16 that they are designed to protect. It should be noted that the first and second side door portions 34,44 and their respective front and back portions are preferably designed to only cover the upper halves of the vehicle 16. Note FIG. 3. It should also be noted that the preferred construction of the present invention is with thermo-plastics.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A covering device for protecting a vehicle from sun damage and the elements, the vehicle having a roof, a hood, a trunk, a first side, and a second side, the first side and the second side each having a door, a forward portion, and a rearward portion, the portable vehicle covering device comprising, in combination:

a roof portion is adapted to be coupled to the roof of the vehicle, the roof portion having a generally rectangular configuration, the roof portion having a hollow interior with an open forward end, an open rearward end, an open first side, and an open second side;

a hood portion slidably received within the open forward end of the roof portion in a retracted orientation, the hood portion sliding outwardly of the roof portion in an extended orientation for covering the hood of the vehicle;

a trunk portion slidably received within the open rearward end of the roof portion in a retracted orientation, the trunk portion sliding outwardly of the roof portion in an extended orientation for covering the trunk of the vehicle;

a first side door portion slidably received within the open first side of the roof portion in a retracted orientation, the first side door portion extending outwardly of the roof portion in an extended orientation for covering the door of the first side of the vehicle, the first side door portion having a generally rectangular configuration and a hollow interior, the first side door portion having an open forward end and an open rearward end, a first front portion slidably received within the open forward end of the first side portion in a retracted orientation, the first front portion extending outwardly of the first side portion in an extended orientation for covering the forward portion of the first side of the vehicle, a first back portion slidably received within the open rearward end of the first side portion in a retracted orientation, the first back portion extending outwardly of the first side portion in an extended orientation for covering the rearward portion of the first side of the vehicle;

a second side door portion slidably received within the open second side of the roof portion in a retracted orientation, the second side door portion extending outwardly of the roof portion in an extended orientation for covering the door of the second side of the vehicle, the second side door portion having a generally rectangular configuration and a hollow interior, the second side door portion having an open forward end and an open rearward end, a second front portion slidably received within the open forward end of the second side portion in a retracted orientation, the second front portion extending outwardly of the second side portion in an extended orientation for covering the forward portion of the second side of the vehicle, a second back portion slidably received within the open rearward end of the second side portion in a retracted orientation, the second back portion extending outwardly of the second side portion in an extended orientation for covering the rearward portion of the second side of the vehicle.

\* \* \* \* \*